US009368992B2

(12) United States Patent
Suzuki

(10) Patent No.: US 9,368,992 B2
(45) Date of Patent: Jun. 14, 2016

(54) POWER STORAGE SYSTEM AND SECONDARY BATTERY CONTROL METHOD

(75) Inventor: Shin Suzuki, Kanagawa (JP)

(73) Assignee: NEC ENERGY DEVICES, LTD., Kanagawa (JP)

(*) Notice: Subject to any disclaimer, the term of this patent is extended or adjusted under 35 U.S.C. 154(b) by 371 days.

(21) Appl. No.: 14/001,215

(22) PCT Filed: Mar. 19, 2012

(86) PCT No.: PCT/JP2012/056979
§ 371 (c)(1),
(2), (4) Date: Aug. 23, 2013

(87) PCT Pub. No.: WO2012/132985
PCT Pub. Date: Oct. 4, 2012

(65) Prior Publication Data
US 2013/0320930 A1    Dec. 5, 2013

(30) Foreign Application Priority Data
Mar. 25, 2011    (JP) ................... 2011-068212

(51) Int. Cl.
*H02J 7/00* (2006.01)
*H01M 10/48* (2006.01)
*H01M 10/42* (2006.01)

(52) U.S. Cl.
CPC ........... *H02J 7/0068* (2013.01); *H01M 10/425* (2013.01); *H01M 10/482* (2013.01);
(Continued)

(58) Field of Classification Search
CPC ................................................... H01M 10/44
USPC ................................................. 320/124–127
See application file for complete search history.

(56) References Cited

U.S. PATENT DOCUMENTS

| 5,744,936 A * | 4/1998 | Kawakami | ........ H01M 10/4207 320/120 |
| 2004/0257041 A1* | 12/2004 | Nagaoka | ............... H02J 7/0024 320/128 |

(Continued)

FOREIGN PATENT DOCUMENTS

| CN | 101682091 A | 3/2010 |
| EP | 2157657 A1 | 2/2010 |

(Continued)

OTHER PUBLICATIONS

Communication dated Sep. 18, 2014 from the European Patent Office in counterpart application No. 12765742.7.

(Continued)

*Primary Examiner* — Paul Dinh
(74) *Attorney, Agent, or Firm* — Sughrue Mion, PLLC

(57) ABSTRACT

A power storage system includes a plurality of secondary battery packs and an upper controller. When causing an additional discharge secondary battery pack that is not being discharged to start being discharged by connecting the additional discharge secondary battery pack in parallel with a discharging secondary battery pack that is being discharged, in a state in which some of the secondary battery packs are being discharged, the upper controller predicts discharge start timing at which inter-terminal voltages of the additional discharge secondary battery pack and the discharging secondary battery pack correspond to each other. Subsequently, the upper controller causes the additional discharge secondary battery pack to start being discharged at the discharge start timing.

11 Claims, 5 Drawing Sheets

(52) U.S. Cl.
CPC ............ *H02J7/0024* (2013.01); *H02J 7/0063* (2013.01); *H01M 10/4207* (2013.01); *H01M 2010/4271* (2013.01); *H01M 2010/4278* (2013.01); *H02J 2007/0067* (2013.01)

(56) References Cited

U.S. PATENT DOCUMENTS

| | | |
|---|---|---|
| 2009/0091299 A1 | 4/2009 | Lin et al. |
| 2013/0038270 A1* | 2/2013 | Endo .................. H02J 7/0019 320/103 |

FOREIGN PATENT DOCUMENTS

| | | |
|---|---|---|
| JP | 2007-244058 A | 9/2007 |
| JP | 2008-278308 A | 11/2008 |
| JP | 2009-033936 A | 2/2009 |

OTHER PUBLICATIONS

Communication dated Mar. 9, 2015, issued by the State Intellectual Property Office of P.R. China in counterpart Chinese application No. 201280012830.5.

* cited by examiner

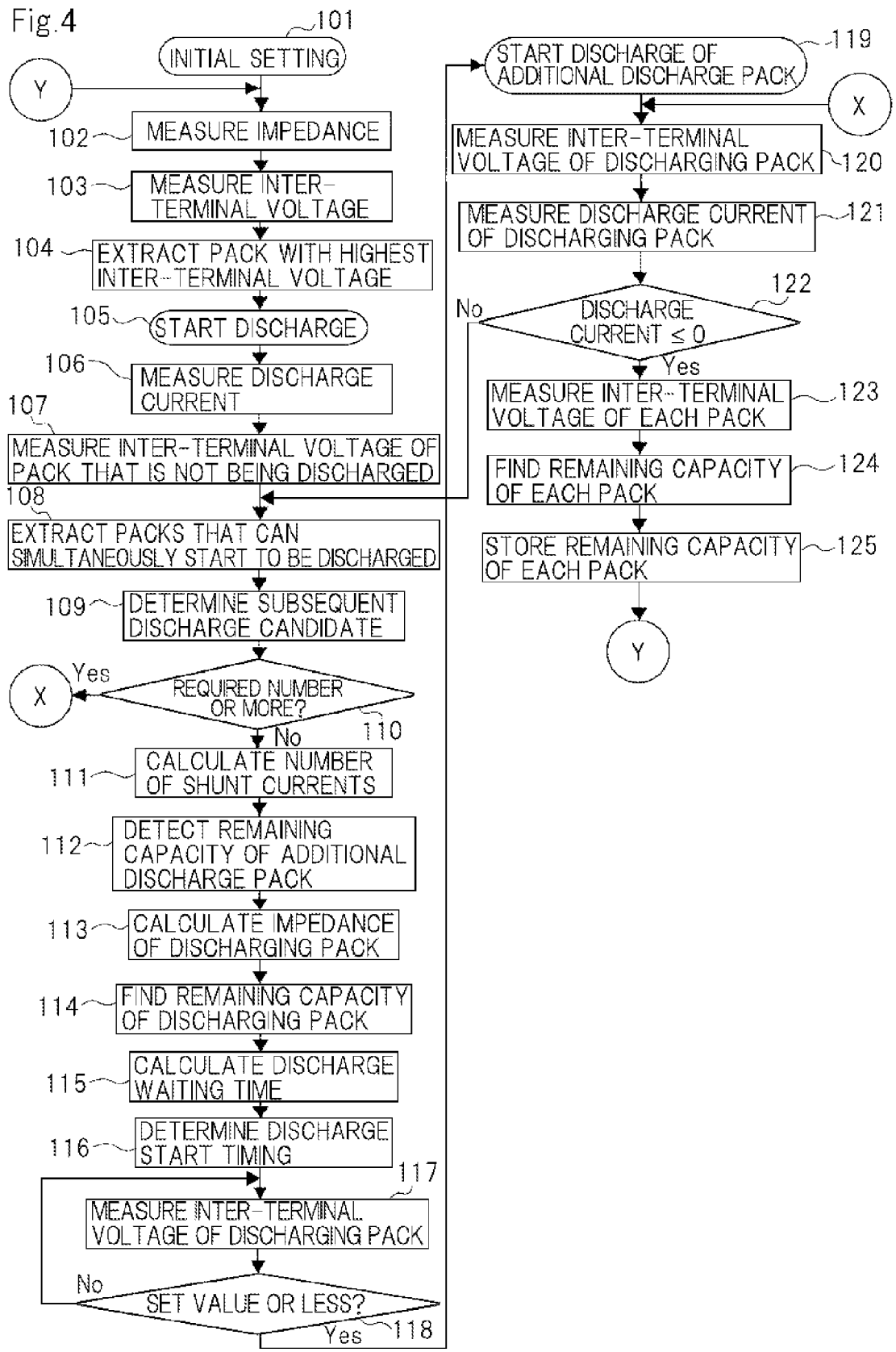

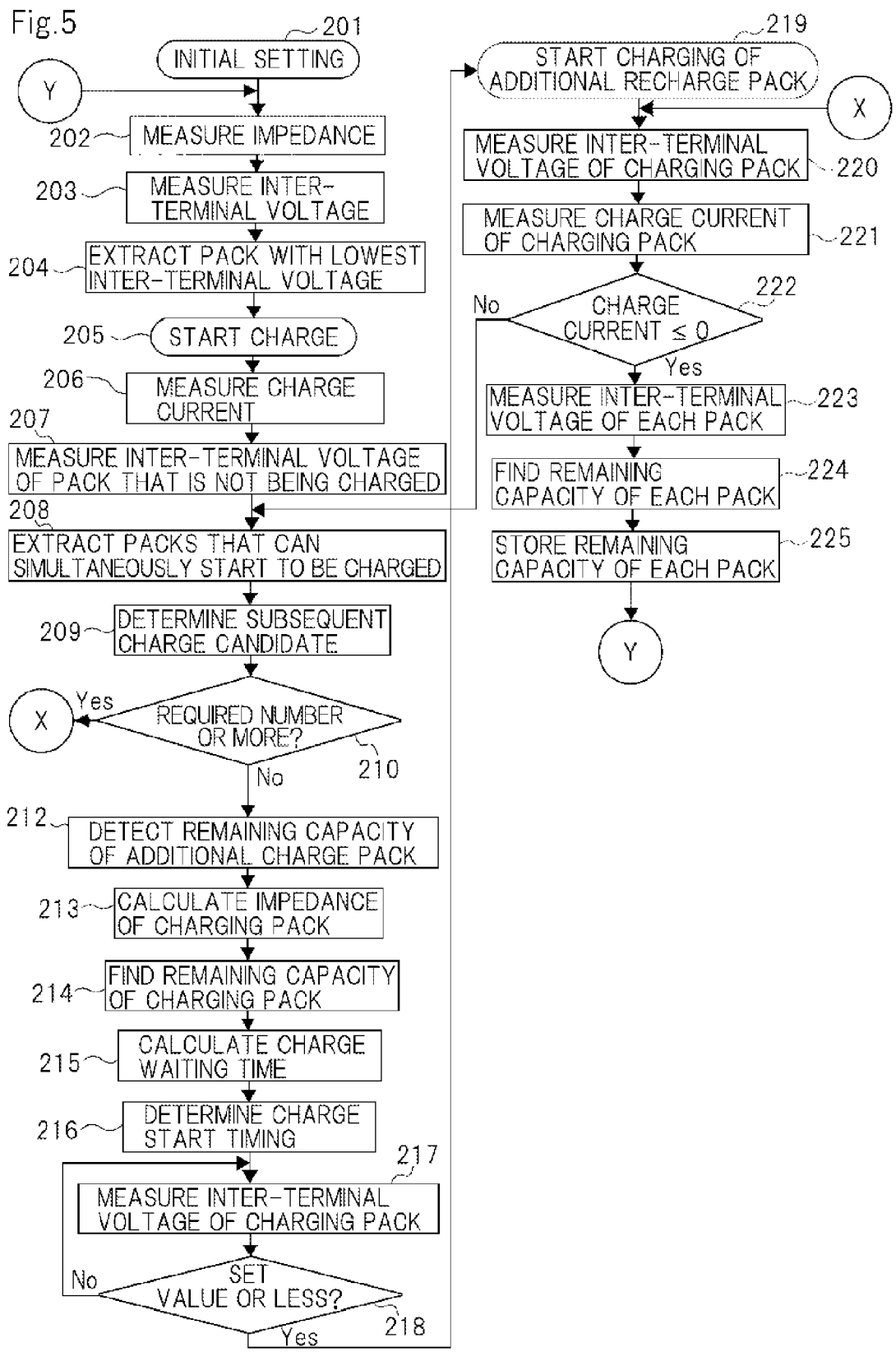

POWER STORAGE SYSTEM AND SECONDARY BATTERY CONTROL METHOD

CROSS REFERENCE TO RELATED APPLICATIONS

This application is a National Stage of International Application No. PCT/JP2012/056979 filed Mar. 19, 2012, claiming priority based on Japanese Patent Application No. 2011-068212 filed Mar. 25, 2011, the contents of all of which are incorporated herein by reference in their entirety.

TECHNICAL FIELD

The present invention relates to a power storage system including a plurality of secondary batteries and a secondary battery control method.

BACKGROUND ART

In recent years, with an upsurge of interest in environmental issues, attention has been focused on power storage systems that accumulate electric power generated by using renewable energy such as PV (Photo Voltaic). In the power storage systems, use of lithium ion secondary batteries that, unlike lead storage batteries, do not contain substances harmful for human bodies and the environment have been studied.

When a power storage system is configured by using lithium ion secondary batteries or the like (hereinafter, simply called "secondary batteries" generically), the power storage system generally adopts a configuration in which a secondary battery pack is formed by connecting a plurality of secondary batteries in series in order to obtain a desired output voltage, and a plurality of the secondary battery packs are connected in parallel in order to obtain a desired power storage capacity.

However, in the configuration in which a plurality of secondary battery packs (or secondary batteries) are connected in parallel, there is the fear that a cross current, in which a current flows between the secondary battery packs due to imbalance in the inter-terminal voltages of the respective secondary battery packs during operation, will occur and that the power storage system cannot be operated normally. Since among the secondary batteries, a difference occurs in deterioration state depending on production dates, temperature environments and the like, imbalance occurs in the inter-terminal voltages of the respective secondary batteries after charge and discharge, and due to imbalance, a cross current occurs among the secondary batteries, if there is a difference in the deterioration state even if the secondary batteries are of the same kind (specifications). This problem becomes more conspicuous as the number of secondary battery packs (or secondary batteries) that are connected in parallel becomes larger.

It is generally known that cross currents between secondary battery packs and between secondary batteries have an adverse effect on a power storage system, and many apparatuses that use a plurality of secondary batteries by connecting secondary batteries in parallel are prohibited from using a mixture of new and old secondary batteries.

However, in reality, a difference occurs in the rate of deterioration among the secondary batteries during operation even if all the secondary batteries are new. Further, there are many situations in which combined use of secondary batteries differing in deterioration state is desired, such as the case in which a power storage system is configured by using a small number of secondary batteries initially, and thereafter, secondary batteries are additionally provided, the case in which a power storage system is configured at low cost by using used secondary batteries, or the like.

From the background as above, the art of reducing user inconvenience by enabling the secondary batteries having different deterioration states to be used safely and freely in power storage systems has been desired.

As the art as above, for example, Patent Literature 1 describes a configuration that includes a plurality of secondary battery packs connectable in parallel with each other via switches, and eliminates imbalance between the inter-terminal voltages of the respective secondary battery packs at the time of discharge by controlling the respective switches provided at each of the secondary battery packs. In the art described in Patent Literature 1, the inter-terminal voltages of the respective secondary battery packs are respectively measured, and discharge is started from the secondary battery pack having the highest inter-terminal voltage. When the inter-terminal voltage drops due to discharge, and becomes substantially equal to the inter-terminal voltage of another secondary battery pack which has not been discharged until then, discharge of the other secondary battery pack is initiated. By performing control like this, the difference between the inter-terminal voltages of the respective secondary battery packs at the time of start of discharge can be reduced, and therefore, occurrence of a cross current can be prevented.

Incidentally, for example, in the secondary battery pack that is being discharged, the current that is supplied to a load is reduced when the other secondary battery pack that is connected in parallel with the secondary battery pack starts to be discharged, and therefore, the inter-terminal voltage rises. Meanwhile, in the secondary battery pack which is not being discharged, the inter-terminal voltage drops when discharge of the secondary battery pack that is not been discharged starts and thereby supplies a current to the load.

In the art described in the above described Patent Literature 1, the change in the inter-terminal voltages like this is not taken into consideration, and therefore, it cannot be said that the cross current which occurs between the secondary battery pack that starts to be discharged and the other secondary battery pack that is already being discharged and that is connected in parallel with the secondary battery pack when the secondary battery pack starts to be discharged is fully prevented.

RELATED ART LITERATURE

Patent Literature

Patent Literature 1: Japanese Patent Laid-Open No. 2009-33936A

SUMMARY

Thus, the present invention has an object to provide a power storage system and a secondary battery control method that can reduce cross current between secondary battery packs (or secondary batteries).

In order to attain the above described object, a power storage system according to an exemplary aspect of the present invention includes a plurality of secondary battery packs, and an upper controller that, when causing an additional discharge secondary battery pack that is not being discharged to be discharged by connecting the additional discharge secondary battery pack in parallel with a discharging secondary battery pack that is being discharged, in a state in which some secondary battery packs from among the plurality of secondary battery packs are being discharged, predicts discharge start timing at which inter-terminal voltages of the additional discharge secondary battery pack and the discharging secondary battery pack correspond to each other, and causes the additional discharge secondary battery pack to start being discharged at the discharge start timing.

Meanwhile, a secondary battery pack control method according to an exemplary aspect of the present invention is a method of controlling a secondary battery for controlling a plurality of secondary battery packs, wherein a computer, when causing an additional discharge secondary battery pack that is not being discharged to be discharged by connecting the additional discharge secondary battery pack in parallel with a discharging secondary battery pack that is being discharged, in a state in which some secondary battery packs from among the plurality of secondary battery packs are being discharged, predicts discharge start timing at which inter-terminal voltages of the additional discharge secondary battery pack and the discharging secondary battery pack correspond to each other, and causes the additional discharge secondary battery pack to start being discharged at the discharge start timing.

BRIEF DESCRIPTION OF DRAWINGS

FIG. 4 is a flowchart showing one example of a processing procedure of a power storage system of the present invention.

FIG. 5 is a flowchart showing another example of the processing procedure of the power storage system of the present invention.

EXEMPLARY EMBODIMENT

Next, the present invention will be described with use of the drawings.

Figure 1:
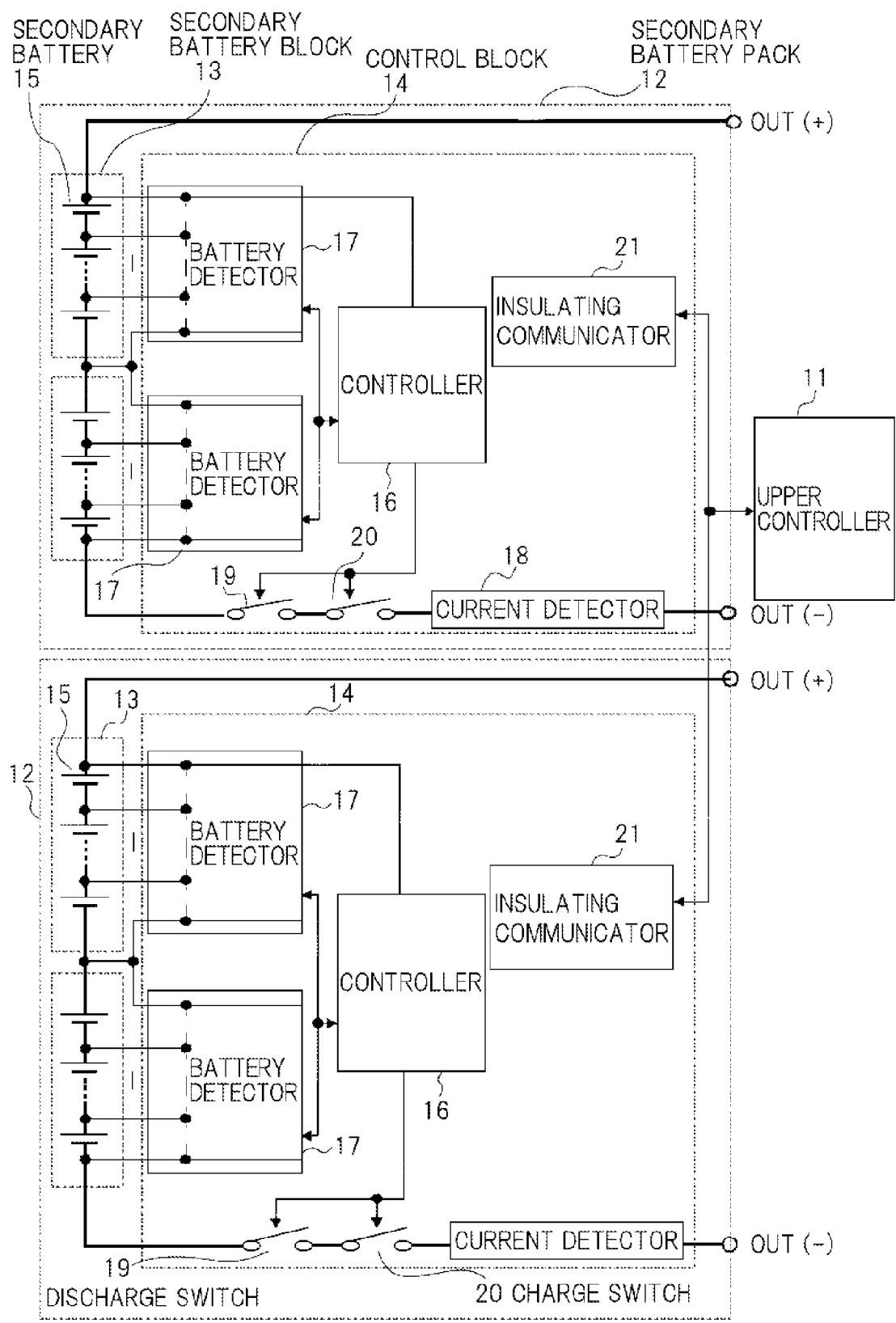
FIG. 1 is a block diagram showing one configuration example of a secondary battery pack of the present invention.

FIG. 1 is a block diagram showing one configuration example of a secondary battery pack of the present invention.

As shown in FIG. 1, a power storage system of the present invention includes upper controller 11, and two secondary battery packs 12 connected in parallel with each other. Secondary battery pack 12 includes two secondary battery blocks 13 that are connected in series, and control block 14. Secondary battery block 13 has a configuration in which, for example, a plurality of secondary batteries 15 are connected in series. Control block 14 includes controller 16, battery detector 17, current detector 18, discharge switch 19, charge switch 20 and insulating communicator 21.

Discharge switch 19 is a switch that turns on and off a discharge path, and charge switch 20 is a switch that turns on and off a charge path. For discharge switch 19 and charge switch 20, for example, MOSFETs (Metal-Oxide-Semiconductor Filed-Effect Transistors) are used. Turning on and off discharge switch 19 and charge switch 20 is controlled by controller 16.

Insulating communicator 21 is an interface circuit that enables transmission and reception of information while electrically insulating controller 16 and upper controller 11. Insulating communicator 21 can be of any configuration that makes controller 16 and upper controller 11 communicable while electrically insulating controller 16 and upper controller 11, and can be configured by using a known insulating device of an optical coupling type, a magnetic coupling type, a capacitive coupling type or the like.

Battery detector 17 measures inter-terminal voltages of respective secondary batteries 15 that are included by secondary battery block 13.

Current detector 18 measures discharge current and charge current of secondary battery pack 12, and notifies controller 16 of a measurement result thereof.

Controller 16 controls operations of battery detector 17, current detector 18, discharge switch 19 and charge switch 20 in accordance with an instruction of upper controller 11. Controller 16 turns on discharge switch 19 when causing secondary battery 15 to be discharged, and turns on charge switch 20 when charging secondary battery 15, for example. Further, controller 16 notifies upper controller 11 of the inter-terminal voltages of respective secondary batteries 15 measured in battery detector 17, and notifies upper controller 11 of the discharge current or the charge current measured in current detector 18, in accordance with instructions from upper controller 11. Battery detector 17, current detector 18 and controller 16 can be realized by, for example, known monitoring (protecting) ICs (Integrated Circuits) for the secondary battery that include these functions.

Upper controller 11 controls an operation of the entire power storage system of the exemplary embodiment by communicating with controller 16 that is included in secondary battery pack 12. Upper controller 11 can be realized by, for example, a known information processing apparatus (a computer or an IC for information processing) including a CPU, a memory, various logic circuits and the like. In this case, upper controller 11 realizes an operation as the power storage system of the present invention that will be described later by executing processing in accordance with a program recorded in a recording medium not illustrated. The recording medium may be any known recording medium such as a magnetic disk, an optical disk, and a semiconductor memory.

FIG. 1 shows the configuration example in which the power storage system includes two secondary battery packs 12, and each of secondary battery packs 12 includes two secondary battery blocks 13, but the power storage system may include three or more secondary battery packs 12, and secondary battery pack 12 may include one, or three or more secondary battery blocks 13.

In the configuration as above, at the time of discharge of the power storage system, upper controller 11 causes secondary battery pack 12 with a larger remaining capacity, that is, secondary battery pack 12 with a higher inter-terminal voltage (open-circuit voltage), from among two secondary battery packs 12, to start discharge first, and thereafter, causes the other secondary battery pack 12 to start discharge. The inter-terminal voltage of secondary battery pack 12 may be found by adding up the inter-terminal voltages of respective secondary batteries 15 or respective secondary battery blocks 13 that are measured in battery detector 17 by upper controller 11, or may be measured by using known voltage measuring means (not illustrated) that is connected between terminals (OUT(+), OUT(−)) of secondary battery pack 12.

When discharge of secondary battery pack 12 is started, the remaining capacity is gradually reduced, and with this, the inter-terminal voltage is also reduced. When the inter-terminal voltage of one secondary battery pack 12 that starts to be discharged first is reduced, and reaches the vicinity of the inter-terminal voltage (open-circuit voltage) of the other secondary battery pack 12 that is not being discharged, upper controller 11 causes the other secondary battery pack 12 to start to be discharged. Even when three or more of secondary battery packs 12 are used, upper controller 11 causes secondary battery pack 12 with the largest remaining capacity to start to be discharged first in order of largest remaining capacity.

Here, in the power storage system of the exemplary embodiment, when the other secondary battery pack (hereinafter, called an additional discharge secondary battery pack) 12 that is not caused to be discharged is caused to start being discharged by being connected in parallel with one secondary battery pack (hereinafter, called the discharging secondary battery pack) 12 that is being discharged, discharge start timing at which the inter-terminal voltages of the additional discharge secondary battery pack and the discharging secondary battery pack correspond to each other is calculated by upper controller 11.

As described above, when the additional discharge secondary battery pack is caused to start being discharged in addition to the discharging secondary battery pack, the supply path for current to a load increases, and therefore, in the discharging secondary battery pack, the current that is supplied to the load is reduced whereas the inter-terminal voltage rises. Meanwhile, in the additional discharge secondary battery pack, the inter-terminal voltage declines to be lower than the open-circuit voltage by supplying the current to the load. The time, at which the raised inter-terminal voltage of the discharging secondary battery pack and the inter-terminal voltage after discharge of the additional discharge secondary battery pack starts become equal, is set as the discharge start timing of the additional discharge secondary battery pack.

The discharge start timing is calculated based on an impedance of the discharging secondary battery pack and an impedance of the additional discharge secondary battery pack. More specifically, the time at which the impedance of the discharging secondary battery pack and the impedance of the additional discharge secondary battery pack correspond to each other is set as the discharge start timing.

Upper controller 11 calculates the impedance of the discharging secondary battery pack by using the inter-terminal voltage of the discharging secondary battery pack that is continuously measured by battery detector 17, and the discharge current that is continuously measured by current detector 18, and records a value thereof. Further, upper controller 11 predicts a change of the following impedance based on impedance history of the discharging secondary battery pack that is recorded. Note that "is continuously measured" indicates that upper controller 11 acquires the inter-terminal voltage and the discharge current at each predetermined processing period and calculates the impedance of the discharging secondary battery pack, and records the values of the impedances that are obtained in time series respectively.

Further, upper controller 11 calculates proper discharge start timing based on the predicted change of the impedance of the discharging secondary battery pack, and the impedance of the additional discharge secondary battery pack predicted in advance. As the method of measuring the impedance of secondary battery pack 12, there are an AC impedance measuring method, and a DC impedance measuring method that are known.

Note that the impedances that are calculated from the measurement values of battery detector 17 and current detector 18 are equal to internal impedances of respective secondary batteries 15 that are included by secondary battery pack 12. The impedance of secondary battery pack 12 includes not only the internal impedances of secondary batteries 15, but also impedances by wiring, switches and the like (external impedances). Therefore, upper controller 11 measures and stores the values of the external impedances of respective secondary battery packs 12 in advance. At the time of impedance calculation of the discharging secondary battery pack, upper controller 11 calculates the internal impedance of each of secondary batteries 15 from the values of the inter-terminal voltage and the discharge current at the present time point, and can use the total value of the external impedance and the internal impedance of each of secondary battery 15 as the impedance of the discharging secondary battery pack.

Next, the calculation methods of the external impedance and the internal impedance of secondary battery pack 12 will be described with use of the drawings.

Figure 2:
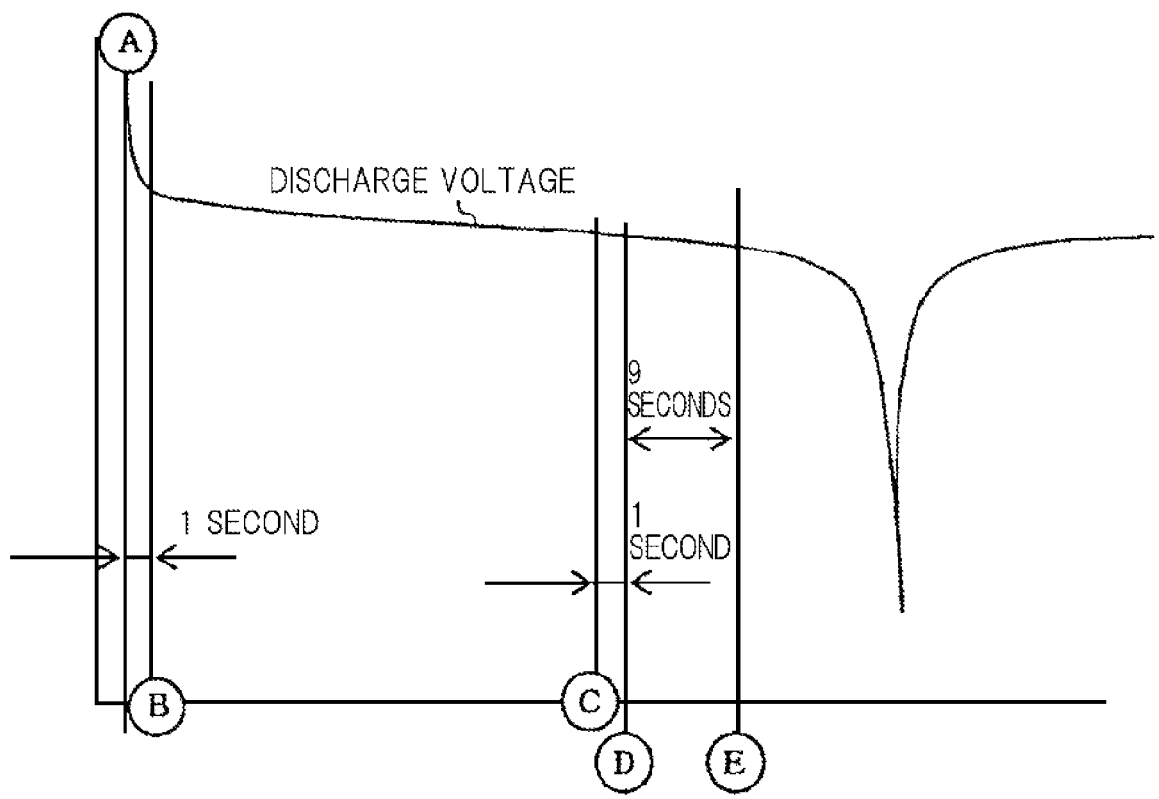
FIG. 2 is a graph showing one example of a change in an inter-terminal voltage at a time of discharge of the secondary battery pack.

FIG. 2 is a graph showing one example of a change of the inter-terminal voltage at the time of discharge of the secondary battery pack.

The external impedance is calculated, for example, by dividing the voltage value which declines in a predetermined time period (short time period) set in advance when secondary battery pack 12 starts to be discharged by a current value. When discharge of secondary battery pack 12 is started, and a current flows into an external load from secondary battery pack 12, the inter-terminal voltage abruptly declines due to the external impedance. From the voltage value that declines, and the value of the current that flows at this time, the external impedance of secondary battery pack 12 can be calculated. The above described predetermined time period is desirably set at a time period as short as possible, in which the voltage decline due to the external impedance sufficiently appears. Here, the predetermined time period is set at one second. A time point A shown in FIG. 2 is a time point at which secondary battery pack 12 shifts to a discharge state from an open state, and a time point B is one second after the time point A, and is used for measurement of the above described external impedance.

Upper controller 11 finds the difference between the inter-terminal voltage of secondary battery pack 12 that is measured at the time point A shown in FIG. 2, and the inter-terminal voltage of secondary battery pack 12 that is measured at the time point B, and calculates the external impedance by dividing the difference voltage value by the current value measured in current detector 18. Upper controller 11 can calculate and update the external impedance of secondary battery pack 12, for example, every time secondary battery pack 12 shifts to the discharge state from the open state.

Further, upper controller 11 finds the internal impedances of respective secondary batteries 15 that are included by the discharging secondary battery pack respectively from the inter-terminal voltage value measured by using battery detector 17 of the discharging secondary battery pack and the current value measured by using current detector 18, and calculates the internal impedance of the discharging secondary battery pack.

Generally, the internal impedance of secondary battery 15 can be calculated, in which secondary battery pack 12 is discharging, by dividing the inter-terminal voltage value of each of secondary batteries 15 that is measured by battery detectors 17 included in each of secondary battery blocks 13, by the current value measured by current detector 18. The internal impedance of secondary battery pack 12 can be obtained by adding up the internal impedances of respective secondary batteries 15.

In order to predict the change of the impedance of secondary battery pack 12, measured values of a plurality of impedances that are obtained in time series are needed, and a measurement error and a variation of the respective impedances that are obtained in time series are preferably reduced. As a method of finding the internal impedance while reducing measurement error and variability, for example, a known moving average method is cited.

Upper controller 11 measures the inter-terminal voltage and the current value of secondary battery pack 12 at each predetermined period, and calculates the average value of the measured values at each time period set in advance, for example, whereby upper controller 11 acquires the time-series values of a plurality of internal impedances.

A calculation example of the internal impedance of secondary battery pack 12 using the moving average method will be described with use of FIG. 2.

Upper controller 11 divides the inter-terminal voltage of the discharging secondary battery pack that is measured at a certain measurement time point (for example, a time point C shown in FIG. 2) by the discharge current measured at the measurement time point. The name of the internal impedance that is obtained at this time is set as D(0) impedance, and a value thereof is set as d(0) Ω.

Similarly, upper controller 11 measures the internal impedance of the discharging secondary battery pack every one second from a time point D until a time point E shown in FIG. 2 (nine seconds). The names of the internal impedances that are obtained at this time are set as D(1) to D(9) impedances, and values thereof are set as d(1) to d(9) Ω. Upper controller 11 uses, for example, the average value of the D(0) to D(9) impedances as the internal impedance of the discharging secondary battery pack at time point E.

When one second further elapses from time point E (time point F: not illustrated), upper controller 11 uses the average value of the internal impedance measured at time point F (D(10) impedance) and D(1) to D(9) impedances as the internal impedance of the discharging secondary battery pack at the time point F.

Similarly, upper controller 11 averages the values of the constant number (10 in the above described example) of the latest internal impedances, among the internal impedances calculated at each predetermined period (one second in the above described example), and thereby calculates the internal impedance at each measurement time point respectively.

The calculation method of the internal impedance of the discharging secondary battery pack is not limited to the aforementioned moving average method, and, for example, the measured value that is obtained at each measurement time point, such as D(1) impedance and D(9) impedance may be directly used.

Upper controller 11 adds the external impedance measured in advance to the internal impedance of the discharging secondary battery pack at each measurement time point, and records the result as the impedance history of the discharging secondary battery pack.

Upper controller 11 predicts the change of the following impedances based on the impedance history of the discharging secondary battery pack, and calculates the discharge start timing by using the prediction result. Thereafter, upper controller 11 causes the additional discharge secondary battery pack to start to be discharged at the predicted discharge start timing.

Note that upper controller 11 may calculate, for example, a time period until the discharge start timing (discharge waiting time period), and may determine that the discharge start timing arrives at a time point at which the discharge wait time period elapses. Further, upper controller 11 may calculate an amount of power that is discharged from the discharging secondary battery pack before the discharge start timing, for example, and may determine that the discharge start timing arrives at a time point at which the power in that amount is discharged from the discharging secondary battery pack.

Further, in the power storage system of the exemplary embodiment, at the time of start of discharge of the additional discharge secondary battery pack, upper controller 11 turns on discharge switch 19 in a state in which charge switch 20 of the additional discharge secondary battery pack is turned off.

Figure 3:
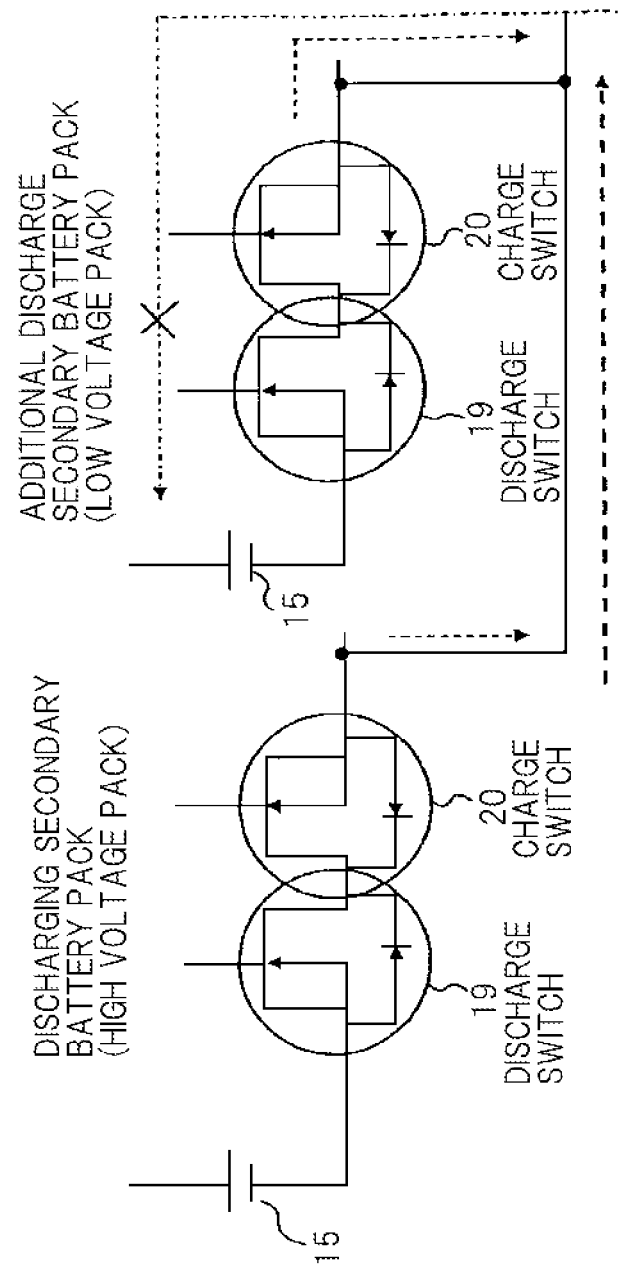
FIG. 3 is a diagram showing the state of current that flows when a discharge switch is turned on in a state in which a charge switch of an additional discharge secondary battery pack is turned off.

FIG. 3 shows a state of current that flows when discharge switch 19 is turned on with charge switch 20 of the additional discharge secondary battery pack kept off.

As described above, in the power storage system of the exemplary embodiment, the inter-terminal voltage of the additional discharge secondary battery pack is lower than the inter-terminal voltage of the discharging secondary battery pack until the additional discharge secondary battery pack starts to be discharged. When discharge switch 19 is turned on in the state in which charge switch 20 is turned off, at the time of start of discharge of the additional discharge secondary battery pack, the discharge current that flows to the load from the additional discharge secondary battery pack is fed back to a negative terminal of secondary battery block 13 of the additional discharge secondary battery pack via a body diode of the MOSFET that is used as charge switch 20. In this case, unless the potential difference that is larger than the forward voltage of the body diode is present between the inter-terminal voltage of the additional discharge secondary battery pack and the inter-terminal voltage of the discharging secondary battery pack, a cross current in which a current flows to the additional discharge secondary battery pack from the discharging secondary battery pack does not occur. Namely, by the body diode of charge switch 20, occurrence of the cross current between the additional discharge secondary battery pack and the discharging secondary battery pack can be prevented. Charge switch 20 of the additional discharge secondary battery pack can be turned on, for example, after the inter-terminal voltage becomes stable.

Note that in the above described description, the operation example at the time of discharge of secondary battery pack 12 is shown, but the similar operation also can be applied to a time of charging of secondary battery pack 12.

When secondary battery pack 12 starts to be charged, the inter-terminal voltage gradually rises with accumulation of electric power. At a time of charging of the power storage system, upper controller 11 starts charging of secondary battery pack 12 with a smaller remaining capacity, that is, secondary battery pack 12 with a lower inter-terminal voltage (open-circuit voltage) first from among two secondary battery packs 12. Subsequently, when the inter-terminal voltage of one secondary battery pack 12 that is previously started charging rises and reaches a vicinity of the inter-terminal voltage (open-circuit voltage) of the other secondary battery pack 12 that is not charged, upper controller 11 starts charging of the other secondary battery pack 12. When three or more of secondary battery packs 12 are used, upper controller 11 starts charging in order of increasing from secondary battery pack 12 having the smallest remaining capacity.

Here, when the other secondary battery pack that is not charged yet (hereinafter, called an additional charge secondary battery pack) is caused to start being charged by being connected in parallel with the one secondary battery pack which is being charged (hereinafter, called a charging secondary battery pack) in the power storage system of the exemplary embodiment, charge start timing at which the inter-terminal voltages of the additional charge secondary battery pack and the charging secondary battery pack correspond to each other is calculated by upper controller 11.

The charge start timing is calculated based on an impedance of the charging secondary battery pack and an impedance of the additional charge secondary battery pack. More specifically, a time at which the impedance of the charging secondary battery pack and the impedance of the additional charge secondary battery pack correspond to each other is set as the charge start timing.

Upper controller 11 creates the impedance history of the charging secondary battery pack, predicts the change of the following impedances from the impedance history, and calculates the charge start timing by using the prediction result thereof. Thereafter, upper controller 11 causes the additional charge secondary battery pack to start to be charged at the predicted charge start timing.

Further, upper controller 11 turns on charge switch 20 in a state in which discharge switch 19 of the additional charge secondary battery pack is turned off, at a time of start of charging the additional charge secondary battery pack.

According to the power storage system of the exemplary embodiment, at the time of discharge of secondary battery pack 12, the discharge start timing at which the inter-terminal voltages of the additional discharge secondary battery pack and the discharging secondary battery pack correspond to each other is predicted, and the additional discharge secondary battery pack is caused to start being discharged at the discharge start timing, whereby the inter-terminal voltage of the additional discharge secondary battery pack and the inter-terminal voltage of the discharging secondary battery pack at the time of starting discharge of the additional discharge secondary battery pack can be made to have the values closer to each other. Namely, the difference between the inter-terminal voltages of respective secondary battery packs 12 at the time of starting discharge can be reduced more than in the background art, and therefore, the cross current that occurs between secondary battery packs 12 can be further reduced.

Similarly, at the time of charging secondary battery pack 12, the charge start timing at which the inter-terminal voltages of the additional charge secondary battery pack and the charging secondary battery pack correspond to each other is predicted, and the additional charge secondary battery pack is caused to start being charged at the charge start timing, whereby the inter-terminal voltage of the additional charge secondary battery pack and the inter-terminal voltage of the charging secondary battery pack at the time of starting to charge the additional charge secondary battery pack can be made to have the values closer to each other. Namely, the difference between the inter-terminal voltages of respective secondary battery packs 12 at the time of starting charging can be reduced more than the background art, and therefore, the cross current that occurs between secondary battery packs 12 can be further reduced.

FIG. 4 is a flowchart showing one example of a processing procedure of the power storage system of the present invention. FIG. 4 shows the one example of the processing procedure in the case in which the power storage system includes a plurality of secondary battery packs 12, and in which a plurality of secondary battery packs 12 are caused to be discharged. Processing shown in FIG. 4 is executed by upper controller 11 shown in FIG. 1.

As shown in FIG. 4, upper controller 11 carries out desired initial setting for respective secondary battery packs 12 (step 101), and thereafter, measures and stores the value of the impedance of each of secondary battery packs 12 (step 102). The impedance can be measured by using a known AC impedance measuring method or DC impedance measuring method. When the impedance of each of secondary battery packs 12 is measured at the time of the end of discharge and at the previous time when charging was ended, the value thereof may be used.

Next, upper controller 11 measures the inter-terminal voltages of respective secondary battery packs 12 (step 103). Here, upper controller 11 measures the inter-terminal voltages (open-circuit voltages) of respective secondary battery packs 12 when respective secondary battery packs 12 are not being charged or are not being discharged.

Next, upper controller 11 extracts secondary battery pack 12 with the highest inter-terminal voltage, and secondary battery pack 12 with the inter-terminal voltage close to this secondary battery pack 12 with the highest inter-terminal voltage, based on the value of the inter-terminal voltage (open-circuit voltage) of each of secondary battery packs 12 that is measured in step 103 (step 104).

Subsequently, upper controller 11 causes secondary battery pack 12 with the highest inter-terminal voltage to start being discharged (step 105). When a plurality of secondary battery packs 12 with the highest inter-terminal voltage are present, that is, when secondary battery packs 12 with the inter-terminal voltages that are close to the inter-terminal voltage of secondary battery pack 12 with the highest inter-terminal voltage are present, upper controller 11 also causes secondary battery packs 12 to start being discharged at the same time.

Next, upper controller 11 measures the discharge current of secondary battery pack 12 in which discharge has been started (step 106).

Next, upper controller 11 measures the inter-terminal voltages of secondary battery packs 12 that are not being discharged, again (step 107), and extracts secondary battery packs 12 that can start to be discharged at the same time therefrom (step 108). Secondary battery packs 12 that are extracted at this time are also secondary battery packs 12 the inter-terminal voltages (open-circuit voltages) of which are close to each other.

Subsequently, upper controller 11 determines secondary battery pack 12 is one subsequent discharge candidate that starts to be discharged next, and has the highest inter-terminal voltage among secondary battery packs 12 that are not being discharged, based on the inter-terminal voltages of respective secondary battery packs 12 measured in step 107 and the combination of secondary battery packs 12 that can start to be discharged at the same time (step 109). There are the cases in which one secondary battery pack 12 is determined as the subsequent discharge candidate here, and a plurality of secondary battery packs 12 are determined as the subsequent discharge candidate here.

Next, upper controller 11 determines whether or not the number of secondary battery packs 12 that are being discharged at present (discharging secondary battery packs) is a desired number or more than a desired number (step 110). Whether or not the number of discharging secondary battery packs is the desired number or more than the desired number can be determined by whether or not the discharge current of the discharging secondary battery pack is larger than the desired current values of various loads that are connected to the power storage system. When the discharging secondary battery pack is absent, upper controller 11 can determine that the number of the discharging secondary battery packs does not satisfy the desired number.

When the number of the discharging secondary battery packs is the desired number or more than the desired number, upper controller 11 shifts to processing of step 120 that will be described later.

In the case in which the number of discharging secondary battery packs is smaller than the desired number, in order to cause secondary battery pack 12 that is the subsequent discharge candidate (additional discharge secondary battery pack) that is determined in step 109 to start to be discharged, upper controller 11 first calculates the number of shunt currents or the shunt ratio at the time of the additional discharge secondary battery pack starts to be discharged (step 111). The number of shunt currents is the total number of secondary battery packs 12 that supply currents to the loads after discharge of the additional discharge secondary battery pack starts, and the shunt ratio is the inverse number of the number of shunt currents. For example, when one secondary battery pack 12 is discharged, the number of shunt currents and the current ratio are one respectively, and when two secondary battery packs 12 are discharged, the number of shunt currents is two and the shunt ratio is 1/2.

Subsequently, upper controller 11 detects the remaining capacity of the additional discharge secondary battery pack (step 112). The remaining capacity may be estimated from the inter-terminal voltage (open-circuit voltage) of the additional discharge secondary battery pack, or the value of the remaining capacity of each of secondary battery packs 12 stored in memory (not illustrated) may be read at the previous time when discharging was ended. In general, the remaining capacity of a secondary battery is frequently estimated as a relative remaining capacity (%) at the time of the full charging capacity (maximum charging capacity: actual capacity) thereof being set at 100%, and it is known that the relative remaining capacity is substantially proportional to the inter-terminal voltage (open-circuit voltage). Therefore, if the inter-terminal voltage (open-circuit voltage) is measured, the remaining capacity of each of secondary battery packs 12 can be found by referring to a table or the like created in advance.

Next, upper controller 11 calculates the impedances of the discharging secondary battery packs respectively (step 113).

Subsequently, upper controller 11 calculates the open-circuit voltage of each of the discharging secondary battery packs based on the values of the impedances of the discharging secondary battery packs calculated in step 113, and finds the remaining capacity of each of the discharging secondary battery packs corresponding to the open-circuit voltage (step 114).

Next, upper controller 11 calculates a time period until the discharge start timing of the additional discharge secondary battery pack (discharge waiting time period) (step 115). At the time of calculation of the discharge waiting time period, upper controller 11 first expresses transition of the impedances that is predicted, of the discharging secondary battery packs by a function using a time as a variable. As is understood from the graph shown in FIG. 2, the inter-terminal voltage of the discharging secondary battery pack declines substantially rectilinearly. The characteristic depends on the change of the internal impedance of secondary battery pack 12 due to discharge. Since the external impedance is basically constant, the change of the impedance of secondary battery pack 12 in the time-axis direction at the time of discharge can be approximated by a straight line, and can be expressed by a linear function.

Consequently, upper controller 11 approximates the impedance of the discharging secondary battery pack by the linear function with the time as a variable. Further, upper controller 11 calculates the time period (the above described discharge waiting time period) until the impedance of the discharging secondary battery pack becomes a discharge start impedance by using the obtained function. The discharge start impedance refers to the impedance of the discharging secondary battery pack in which a cross current does not occur even if the additional discharge secondary battery pack starts to be discharged. That is, the discharge start impedance is equal to the impedance of the additional discharge secondary battery pack. Here, when the discharging secondary battery pack has the discharge start impedance, and the additional discharge secondary battery pack does not start to be discharged yet, the inter-terminal voltage of the discharging secondary battery pack is called a discharge start voltage.

Upper controller 11 determines the discharge start timing from the above described discharge waiting time period (step 116), measures the inter-terminal voltage of the discharging secondary battery pack earlier than the discharge start timing by a predetermined time set in advance (step 117), and determines whether or not the measured inter-terminal voltage is a predetermined set value (the above described discharge start voltage) or less than a predetermined set value (step 118).

When the inter-terminal voltage of the discharging secondary battery pack is not a set value or less, upper controller 11 repeats processing of steps 117 and 118.

When the inter-terminal voltage of the discharging secondary battery pack is the set value or less, upper controller 11 causes the additional discharge secondary battery pack to start to be discharged (step 119).

FIG. 4 shows a processing example of calculating the time period (discharge waiting time period) until the discharge start timing, and of measuring the inter-terminal voltage of the discharging secondary battery pack at the time point closer to the discharge start timing to determine whether or not to cause the additional discharge secondary battery pack to start to be discharged. Use of the discharge waiting time period as above makes complicated voltage measurement, calculation processing and the like unnecessary, until the discharge start timing approaches, and only the time needs to be measured. Therefore, the processing load of upper controller 11 can be reduced. Meanwhile, when the discharge start timing approaches, the inter-terminal voltage of the additional discharge secondary battery pack and the inter-terminal voltage of the discharging secondary battery pack at the time of start of discharge of the additional discharge secondary battery pack can be matched with each other with high precision by actually measuring the inter-terminal voltage of the discharging secondary battery pack. Therefore, occurrence of a cross current between secondary battery packs 12 at the time of start of discharge of the additional discharge secondary battery pack can be prevented.

Next, upper controller 11 measures the inter-terminal voltages of the respective discharging secondary battery packs including secondary battery pack 12 that newly starts to be discharged (step 120), and further measures discharge currents of each of the discharging secondary battery packs (step 121).

Next, upper controller 11 determines whether or not the sum of the discharge currents of the discharging secondary battery packs is zero or less (step 122). When the sum of the discharge currents is not zero or less, the power storage system is being discharged, and therefore, upper controller 11 repeats processing from step 108.

When the sum of the discharge currents is zero or less, the power storage system stops discharge, and therefore upper controller 11 measures the inter-terminal voltages (open-circuit voltages) of each of secondary battery packs 12 (step 123), and finds the remaining capacities of respective secondary battery packs 12 from the open-circuit voltages, respectively (step 124). At this time, upper controller 11 may measure the impedance of each of secondary battery packs 12.

Subsequently, upper controller 11 stores the remaining capacity of each of secondary battery packs 12 obtained in step 124 in memory (not illustrated) (step 125), and repeats processing from step 102.

FIG. 5 is a flowchart showing another example of the processing procedure of the power storage system of the present invention. FIG. 5 shows one example of the processing procedure in the case in which the power storage system includes a plurality of secondary battery packs 12, and a plurality of secondary battery packs 12 are charged. The processing shown in FIG. 5 is also executed by upper controller 11 shown in FIG. 1.

As shown in FIG. 5, upper controller 11 carries out desired initial setting for respective secondary battery packs 12 (step 201), and thereafter measures and stores the value of the impedance of each of secondary battery packs 12 (step 202).

Next, upper controller 11 measures the inter-terminal voltages of respective secondary battery packs 12 (step 203). Here, upper controller 11 measures the inter-terminal voltages (open-circuit voltages) of each of secondary battery packs 12 at the time when each of secondary battery packs 12 are not being charged or are not being discharged. The processing of steps 201 to 203 shown in FIG. 5 may be the processing common to steps 101 to 103 shown in FIG. 4.

Next, upper controller 11 extracts secondary battery pack 12 with the lowest inter-terminal voltage, and secondary battery pack 12 whose inter-terminal voltage is close to that of secondary battery pack 12 with the lowest inter-terminal voltage, based on the value of the inter-terminal voltage (open-circuit voltage) of each of secondary battery packs 12 that is measured in step 203 (step 204).

Subsequently, upper controller 11 causes secondary battery pack 12 with the lowest inter-terminal voltage to start to be charged (step 205). When a plurality of secondary battery packs 12 with the lowest inter-terminal voltage are present, that is, when secondary battery packs 12 whose the inter-terminal voltages are close to that of secondary battery pack 12 with the lowest inter-terminal voltage are present, upper controller 11 also causes secondary battery packs 12 to start being charged at the same time.

Next, upper controller 11 measures the charge current of secondary battery pack 12 that is caused to start being charged (step 206).

Next, upper controller 11 re-measures the inter-terminal voltages of secondary battery packs 12 that are not being charged (step 207), and extracts secondary battery packs 12 that can start being charged at the same time from them (step 208). Secondary battery packs 12 that are removed this time are also secondary battery packs 12 the inter-terminal voltages (open-circuit voltage) of which are close to each other.

Subsequently, upper controller 11 determines that secondary battery packs 12 is subsequent charge candidate that next starts to be charged, and has the lowest inter-terminal voltage among secondary battery packs 12 that are not being charged, based on the inter-terminal voltages of respective secondary battery packs 12 measured in step 207, and the combination of secondary battery packs 12 that can start being charged at the same time, and that are removed in step 208 (step 209). There are the cases in which one secondary battery pack 12 that is the subsequent charge candidate is determined here, and a plurality of secondary battery packs 12 that are the subsequent charge candidate are determined here.

Next, upper controller 11 determines whether or not the number of secondary battery packs 12 that are being charged at present (charging secondary battery packs) is a desired number or more (step 210). Whether or not the number of charging secondary battery packs is the desired number or more can be determined by whether or not the electric power necessary for charging of the charging secondary battery packs is larger than surplus power that is generated by, for example, PV or the like and is not used in the load or the like. When the charging secondary battery pack can not be found, upper controller 11 may determine that the number of the charging secondary battery packs does not satisfy the desired number.

When the number of charging secondary battery packs 12 is the desired number or more, upper controller 11 shifts to processing of step 220 that will be described later.

In the case in which the number of charging secondary battery packs 12 is smaller than the desired number, upper controller 11 detects a power storage amount (remaining capacity) of secondary battery pack 12 that is the subsequent charge candidate (additional charge secondary battery pack) determined in step 209 (step 212). The remaining capacity may be estimated from the inter-terminal voltage (open-circuit voltage) of the additional charge secondary battery pack, or may be read the value of the remaining capacity of each of secondary battery packs 12 that is measured and stored at the previous time when discharging was ended and when charging was ended.

Next, upper controller 11 calculates the impedances of the charging secondary battery packs respectively (step 213).

Subsequently, upper controller 11 calculates the open-circuit voltage of each of the charging secondary battery packs based on the values of the impedances of the charging secondary battery packs calculated in step 213, and finds the remaining capacity of each of the charging secondary battery packs corresponding to the open-circuit voltage (step 214).

Next, upper controller 11 calculates a time period until the charge start timing of the additional charge secondary battery pack (charge waiting time period) (step 215). At the time of calculation of the charge waiting time period, upper controller 11 first expresses transition of the impedances that is predicted, of the charging secondary battery packs by a function with a time as a variable. The impedance of the charging secondary battery pack can be approximated by the linear function with the time as a variable similar to the impedance of the above described discharging secondary battery pack, for example. Upper controller 11 calculates the time period (the above described charge waiting time period) until the impedance of the charging secondary battery pack becomes a charge start impedance by using the obtained function. The charge start impedance refers to the impedance of the charging secondary battery pack in which a cross current does not occur even if charge of the additional charge secondary battery pack is started. That is, the charge start impedance is equal to the impedance of the additional charge secondary battery pack. Here, when the charging secondary battery pack has the charge start impedance, charging of the additional charge secondary battery pack does not yet start, the inter-terminal voltage of the charging secondary battery pack is called a charge start voltage.

Upper controller 11 determines the charge start timing from the above described charge waiting time period (step 216), measures the inter-terminal voltage of the charging secondary battery pack earlier than the charge start timing by a predetermined time set in advance (step 217), and determines whether or not the measured inter-terminal voltage is a predetermined set value (the above described charge start voltage) or less (step 218).

When the inter-terminal voltage of the charging secondary battery pack is not the set value or less, upper controller 11 repeats the processing of steps 217 and 218.

When the inter-terminal voltage of the charging secondary battery pack is the set value or less, upper controller 11 starts charging of the additional charge secondary battery pack (step 219).

FIG. 5 shows the processing example of calculating the time period (charge waiting time period) until the charge start timing, and measuring the inter-terminal voltage of the charging secondary battery pack at the time point closer to the charge start timing to determine whether or not to start charging of the additional charge secondary battery pack. Use of the charge waiting time period as above makes complicated voltage measurement, calculation processing and the like unnecessary until the charge start timing approaches, and only the time needs to be measured. Therefore, the processing load of upper controller 11 can be reduced. Meanwhile, when the charge start timing approaches, the inter-terminal voltage of the additional charge secondary battery pack and the inter-terminal voltage of the charging secondary battery pack at the time of starting charging of the additional charge secondary battery pack can be matched with each other with high precision by actually measuring the inter-terminal voltage of the charging secondary battery pack. Therefore, occurrence of a cross current between secondary battery packs 12 at the time when charging of the additional charge secondary battery pack is started can be prevented.

Next, upper controller 11 measures the inter-terminal voltages of the respective charging secondary battery packs including secondary battery pack 12 that newly starts to be charged (step 220), and further measures charge currents of the respective charging secondary battery packs (step 221).

Next, upper controller 11 determines whether or not the sum of the charge currents of the charging secondary battery packs is zero or less (step 222). When the sum of the charge currents is not zero or less, the power storage system is being charged, and therefore, upper controller 11 repeats the processing from step 208.

When the sum of the charge currents is zero or less, the power storage system stops charging, and therefore upper controller 11 measures the inter-terminal voltages (open-circuit voltages) of respective charging secondary battery packs respectively (step 223), and finds the power storage amounts (remaining capacities) of respective secondary battery packs 12 that stop charge from the open-circuit voltages, respectively (step 224). At this time, upper controller 11 may measure the impedance of each of secondary battery packs 12.

Subsequently, upper controller 11 stores the remaining capacity of each of secondary battery packs 12 obtained in step 224 in the memory (not illustrated) (step 225), and repeats the processing from step 202.

The invention of the present application is described thus far with reference to the exemplary embodiment, but the invention of the present application is not limited to the above described exemplary embodiment. For the configuration and the details of the invention of the present application, various modifications that a person skilled in the art can understand can be made within the scope of the invention of the present application.

This application claims priority of Japanese Patent Application No. 2011-068212 filed on Mar. 25, 2011, the disclosures of which are incorporated herein by reference.

The invention claimed is:

1. A power storage system comprising:
a plurality of secondary battery packs; and
a controller that, when causing an additional discharge secondary battery pack that is not being discharged to be discharged by connecting the additional discharge secondary battery pack in parallel with a discharging secondary battery pack that is being discharged, predicts discharge start timing at which the inter-terminal voltage of the additional discharge secondary battery pack becomes equal to the inter-terminal voltage of the discharging secondary battery pack, and that causes the additional discharge secondary battery pack to start being discharged at the discharge start timing.

2. The power storage system according to claim 1, wherein the secondary battery packs comprise
a battery detector that measures an inter-terminal voltage of the secondary battery packs, and
a current detector that measures a discharge current and a charge current of the secondary battery packs,
and wherein the controller predicts a change of an impedance of the discharging secondary battery pack based on a change of the inter-terminal voltage of the discharging secondary battery pack measured by the battery detector and a discharge current measured by the current detector, and sets a time when the impedance of the discharging secondary battery pack corresponds to an impedance of the additional discharge secondary battery pack that is measured in advance, as the discharge start timing.

3. The power storage system according to claim 2, wherein the controller
retains in advance a value of an external impedance except for an internal impedance of a secondary battery included in the secondary battery pack, calculates an internal impedance of a secondary battery of the discharging secondary battery pack based on the inter-terminal voltage during discharge of the discharging secondary battery pack, and sets a sum of the external impedance and the internal impedance as the impedance of the secondary battery pack.

4. The power storage system according to claim 1, wherein the controller
calculates a discharge waiting time period that is a time period until the discharge start timing, or an amount of power that is discharged by the discharge start timing, and when the discharge waiting time period elapses, or when the amount of power is discharged, determines that the discharge start timing has arrived.

5. The power storage system according to claim 1, wherein the controller
calculates a discharge waiting time period that is a time period until the discharge start timing, and a discharge start voltage that is the inter-terminal voltage of the discharging secondary battery pack in the discharge start timing, determines whether or not the inter-terminal voltage of the discharging secondary battery pack has reached the discharge start voltage at a preset predetermined time before the discharge waiting time period, and causes the additional discharge secondary battery pack to start being discharged when the inter-terminal voltage of the discharging secondary battery pack has reached the discharge start voltage.

6. The power storage system according to claim 1, the system further comprising:
a discharge switch that turns on and off discharge of the secondary battery pack; and
a charge switch that turns on and off charging the secondary battery pack,
wherein the controller turns on the discharge switch in a state in which the charge switch is turned off when starting discharge of the additional discharge secondary battery pack.

7. The power storage system according to claim 1, wherein the controller, when causing an additional charge secondary battery pack that is not being charged to start being charged by connecting the additional charge secondary battery pack in parallel with a charging secondary battery pack that is being charged, in a state in which some secondary battery packs from among the plurality of secondary battery packs are charged, predicts charge start timing at which inter-terminal voltages of the additional charge secondary battery pack and the charging secondary battery pack correspond to each other, and starts charging the additional charge secondary battery pack at the charge start timing.

8. The power storage system according to claim 7, wherein the controller predicts a change of an impedance of the charging secondary battery pack based on a change of the inter-terminal voltage of the charging secondary battery pack that is measured by the battery detector and a charge current that is measured by the current detector, and sets a time when the impedance of the charging secondary battery pack corresponds to an impedance of the additional charge secondary battery pack that is measured in advance, as the charge start timing.

9. The power storage system according to claim 7, the system further comprising:

a discharge switch that turns on and off discharge of the secondary battery pack; and a charge switch that turns on and off charging of the secondary battery pack, wherein the controller turns on the charge switch in a state in which the discharge switch is turned off when starting charging of the additional charge secondary battery pack.

10. A secondary battery pack control method for controlling a plurality of secondary battery packs, wherein a computer, when causing an additional discharge secondary battery pack that is not being discharged to be discharged by connecting the additional discharge secondary battery pack in parallel with a discharging secondary battery pack that is being discharged, predicts discharge start timing at which the inter-terminal voltage of the additional discharge secondary battery pack becomes equal to the inter-terminal voltage of the discharging secondary battery pack, and causes the additional discharge secondary battery pack to start being discharged at the discharge start timing.

11. The power storage system according to claim 8, the system further comprising:

a discharge switch that turns on and off discharge of the secondary battery pack; and a charge switch that turns on and off charging of the secondary battery pack, wherein the upper controller turns on the charge switch in a state in which the discharge switch is turned off when starting charging of the additional charge secondary battery pack.

* * * * *